(12) United States Patent
Jackl et al.

(10) Patent No.: US 12,440,873 B2
(45) Date of Patent: Oct. 14, 2025

(54) CLEANING DEVICE FOR A HEADLIGHT, IN PARTICULAR A VEHICLE HEADLIGHT

(71) Applicant: ZKW Group GmbH, Wieselburg (AT)

(72) Inventors: Christian Jackl, Wieselburg (AT); Georg Pitterle, Texing (AT); Thomas Reiter, Ferschnitz (AT)

(73) Assignee: ZKW Group GmbH, Wieselburg (AT)

( * ) Notice: Subject to any disclaimer, the term of this patent is extended or adjusted under 35 U.S.C. 154(b) by 503 days.

(21) Appl. No.: 17/914,470

(22) PCT Filed: Feb. 22, 2021

(86) PCT No.: PCT/EP2021/054303
§ 371 (c)(1),
(2) Date: Sep. 26, 2022

(87) PCT Pub. No.: WO2021/190845
PCT Pub. Date: Sep. 30, 2021

(65) Prior Publication Data
US 2023/0124469 A1      Apr. 20, 2023

(30) Foreign Application Priority Data
Mar. 26, 2020    (EP) .................................... 20165956

(51) Int. Cl.
*B08B 7/02*         (2006.01)
*B60S 1/56*         (2006.01)
(Continued)

(52) U.S. Cl.
CPC ............... *B08B 7/028* (2013.01); *B60S 1/56* (2013.01); *G02B 27/0006* (2013.01); *B06B 1/06* (2013.01); *B60Q 1/04* (2013.01)

(58) Field of Classification Search
CPC .... B08B 7/028; B60S 1/56; B60S 1/02; B60S 1/603; G02B 27/0006; B06B 1/06; B60Q 1/04
(Continued)

(56) References Cited

U.S. PATENT DOCUMENTS

2018/0031740 A1*   2/2018   Alarcon .................. F21S 45/00

FOREIGN PATENT DOCUMENTS

| DE | 4435941 A1 | 4/1995 |
| DE | 102012005109 A1 | 9/2019 |
| FR | 2841488 A1 | 1/2004 |

OTHER PUBLICATIONS

Cleaning Device For A Headlight, In Particular Vehicle Headlight; Wilm Thomas Dr; DE 4435941 A1 (Year: 1994).*
(Continued)

*Primary Examiner* — Bumsuk Won
*Assistant Examiner* — Rahman Abdur
(74) *Attorney, Agent, or Firm* — Eversheds Sutherland (US) LLP

(57) ABSTRACT

The invention relates to a cleaning device (10) for cleaning at least one cover glass (2) of a headlamp, in particular a vehicle headlamp (1), wherein the cover glass (2) comprises on its outer side (3) a hydrophobic and dirt-repelling coating (20) and at least one vibration element (11) is fastened to the at least one cover glass (2), wherein the at least one vibration element (11) can be activated by a control device (30). The scope of the invention further includes a headlamp, in particular a vehicle headlamp (1), with a cleaning device (10).

13 Claims, 4 Drawing Sheets

(51) Int. Cl.
  *G02B 27/00*  (2006.01)
  *B06B 1/06*  (2006.01)
  *B60Q 1/04*  (2006.01)
(58) Field of Classification Search
  USPC .......................................................... 359/507
  See application file for complete search history.

(56) References Cited

OTHER PUBLICATIONS

Vehicular Lamp, Taku et al. ; JP 2008108500, (Year: 2006).*
Detector, Especially Of Obstacles To Parking Behind Motor Vehicle, Has Transparent Window With Liquid Spray And Vibrator To Clean It; Pierre (FR 2841488) (Year: 2004).*
International Search Report for PCT/EP2021/054303, dated Apr. 16, 2021 (10 pages).
Search Report for European Patent Application No. 20165956.2 dated Sep. 14, 2020 (7 pages).

* cited by examiner

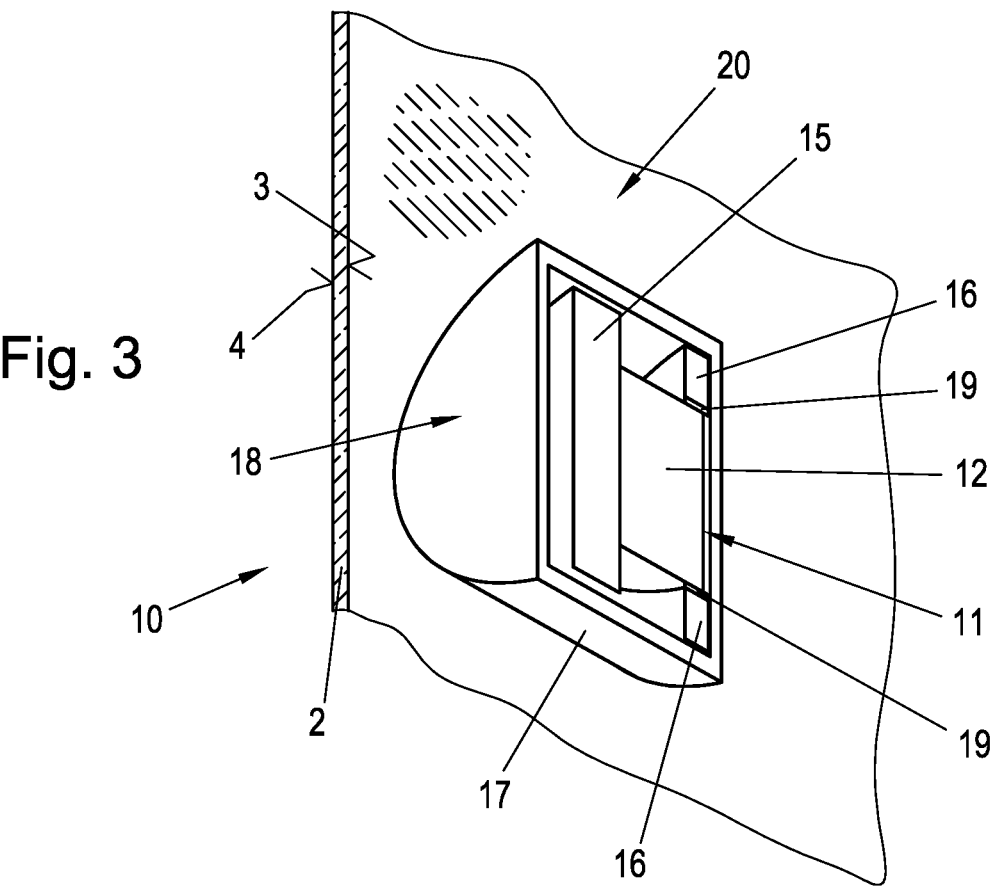
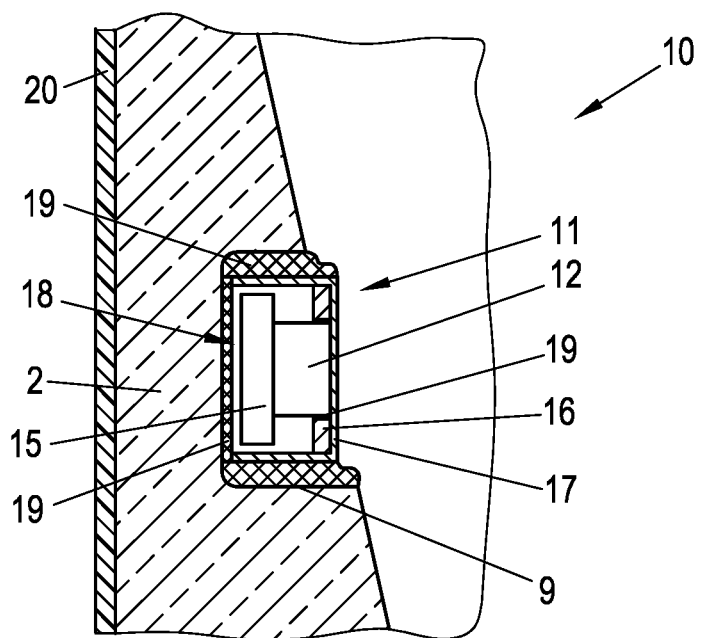

CLEANING DEVICE FOR A HEADLIGHT, IN PARTICULAR A VEHICLE HEADLIGHT

The invention relates to a cleaning device for a cover glass of a headlamp, in particular a vehicle headlamp.

Different cleaning devices in numerous embodiments are already known from the prior art for headlamps, in particular for vehicle headlamps. For example, headlamp cleaning systems have already long been known, in which a cleaning fluid is sprayed by means of high pressure from outside onto the one or more cover glasses of a headlamp. Especially in the case of front headlamps of a vehicle, such soiling of the cover glass can be reliably removed. A drawback with such headlamp cleaning systems is that the latter consist of numerous parts and components which are prone to failure and maintenance-intensive. With such high-pressure washing system, which usually have a high consumption of washing fluid, therefore, storage tanks with several litres of washing fluid are required. As a washing fluid, use is usually made of water with suitable additives such as in the summer with suitable insect remover or the winter with suitable frost protection. The nozzles of such high-pressure system spray water at pressures up to 50 bar from mobile nozzles from outside onto the cover glasses of the headlamps. The cover glasses can become prematurely cloudy if unsuitable additives are used, which is a further drawback of these previously known cleaning systems. For vehicles which are equipped with such headlamp systems, the legislator also examines their proper functioning. Vehicle owners, who are unhappy with the high water consumption of their headlamp cleaning system and therefore allow the latter to deactivate, risk having the operating license for their vehicle cancelled.

Moreover, such headlamp cleaning systems for front headlamps are problematic from the viewpoint of pedestrian protection, because on account of the high-pressure cleaning nozzles mounted mobile, which are usually integrated in the area of the front bumper, the risk of injury in the event of a collision of the vehicle with a pedestrian increases.

Brush and wiper cleaning systems, which have long been known and which mechanically clean the outer sides of the cover glasses of headlamps during the journey, are in turn many times more expensive in terms of equipment and also more maintenance-intensive than the aforementioned headlamp cleaning systems with a high-pressure pump. Furthermore, in the case of mechanically operating systems for cover glasses of headlamps, the wear on the wipers and/or brushes after a certain amount of time in operation is a drawback.

The purpose of the present invention, therefore, is to overcome the drawbacks of cleaning systems for cover glasses of a headlamp previously known from the prior art and to specify a cleaning device, which is designed as cost-effective and compact as possible with the fewest possible components and parts and which can clean the at least one cover glass of a headlamp, in particular vehicle headlamp, with as little wear as possible and as maintenance-free as possible. Furthermore, it is a problem of the invention to specify a cleaning device, which as far as possible manages to operate without the use of washing fluid or of other consumables.

The problem is solved with a cleaning device according to the preamble of claim 1 with the features of the characterising part of claim 1.

The sub-claims relate to advantages embodiments of the invention.

Generally, the assignment of terms relating to location or orientation, such as for example "horizontal", "vertical", "in a horizontal direction", "in a vertical direction", "above", "below", "in front of", "beneath the latter", "above the latter", "inside", "outside", etc. are selected in the following text solely for the sake of simplification and these terms possibly relate to the representation in the drawings, but not necessarily to an actual position in use or position of the cleaning device according to the invention, its components or a headlamp equipped with the cleaning device.

According to the invention, in a cleaning device for at least one cover glass of a headlamp, in particular a vehicle headlamp, the cover glass comprises at its outer side a hydrophobic and dirt-repelling coating and at least one vibration element is fastened to the at least one cover glass, wherein the at least one vibration element can be activated by a control device.

Advantageously, the following components cooperate efficiently in a cleaning device according to the invention for cleaning one or more cover glasses of a headlamp, in particular a vehicle headlamp:

(i) the at least vibration element, which is fastened to the at least one cover glass and which can be activated by a control device, ensures that the cover glass of the headlamp, whenever dirt begins to collect on the outer side of the at least one cover glass or when it becomes necessary, is caused to vibrate and the soiling can this be shaken off from the cover glass;

(ii) the hydrophobic and dirt-repelling coating on the outer side of the at least one cover glass ensures that the soiling in the form of dirt particles or dirty water does not adhere on account of minimised adhesion to the coated outer side of the cover glass, but rather the dirt particles run off from the cover glass.

Depending on the embodiment, in the cleaning system according to the invention the at least one vibration element can be fastened directly adjacent to the at least one cover glass or the vibration element can be arranged on another element such as for example a counterweight, wherein the counterweight lying beneath is fastened to the at least one cover glass. In this case, too, the vibration element is fastened to the cover glass, but with a further layer such as for example a counterweight between the cover glass and the vibration element. The fastening of the vibration element to the cover glass offers the advantage that the oscillations or vibrations are introduced locally into the cover glass and the cleaning of the cover glass is thus particularly efficient.

The at least one vibration element can comprise for example an ultrasonic oscillator, which causes the cover glass to vibrate with frequencies in the ultrasound range from 16 kHz and thus serves to shake off soiling for example in the form of dirt particles, water droplets or an ice coating from the cover glass.

So-called nanocoatings can for example be used as a hydrophobic and a dirt-repelling coating, which make use of the Lotus effect. Dirt and surface experience here very small adhesive forces. Moisture particles and dirt particles are enclosed in the water rolling off and the soiling simply rolls off from the hydrophobic coating.

Scratch-resistant, weather-protected coating materials, which cure by UV radiation and provide protection for cover glasses made for example from transparent polycarbonate (PC) or polymethyl methacrylate (PMMA) against abrasion, chemical damage, erosion or yellowing due to UV radiation and against soiling, can also be applied as a hydrophobic or a dirt-repelling coating on the outer side of the at least one cover glass. Such coatings, which amongst other things serve as weather protection for cover glasses, are also referred to as silicone hardcoat. For example, such a coating material, which is suitable for weather-resistant and dirt-repelling coatings of cover glasses of vehicle headlamps, is marketed by Momentive Performance Materials Inc. (www.momentive.com) under the product name SilFORT* UVHC5000.

Advantageously, in the cleaning device according to the invention the combination of the cover glass provided with at least one vibration element, which moreover is equipped with a dirt-repelling outer coating, means that the use of external washing fluid together with the fluid tank usually required for the latter and equipment such as pumps, feed hoses and washing nozzles for spraying the washing fluid onto the cover glasses can be completely dispensed with in the average case of application of a headlamp, in particular a vehicle headlamp. On the one hand, the design of a headlamp equipped with a cleaning device according to the invention is thus greatly simplified compared to conventional high-pressure headlamp cleaning systems. On the other hand, as a result of the absence of mechanically moving parts, which conventional headlamp cleaning systems for motor vehicles usually comprise, the pedestrian protection is significantly improved when use is made of a cleaning device according to the invention for a vehicle headlamp.

Expediently, the at least one vibration device can be coupled with a counterweight fastened to the at least one cover glass in a cleaning device in a first variant of the invention.

In this embodiment, at least one counterweight is fastened to the cover glass. Vibrations of the vibration element, which is coupled with the counterweight, are transferred from the vibration element to the counterweight and from the latter, in an intensified form, directly onto the cover glass. The vibrating effect of the vibration element is intensified as resonance of the counterweight coupled therewith and thus the cleaning effect of the cover glass is further improved.

In a particularly compact development of the invention, the at least one vibration element can be connected in one piece to the counterweight in the cleaning device.

Furthermore, the combination of a vibration element, which is connected in one piece to a counterweight or is integrated into one component, can also be referred to as a vibration element.

This compact embodiment offers the advantage that the vibration element can be constituted as a closed, encapsulated vibration unit with a housing, which now only has to be contracted electrically. Depending on the circumstances and depending on the size of the cover glass, the area of the cover glass to be cleaned and the nature and quantity of the soiling, a number of such vibration elements can be fastened to the cover glass as required. The control of the plurality of vibration elements can take place expediently from a single control unit.

It can be advantageous in the cleaning device according to the invention if the at least one vibration element is connected to the at least one cover glass permanently by jointing.

The term "jointing" groups together different jointing methods according to DIN 8593-1. In jointing, two or more solid bodies, the jointing parts, are connected or jointed permanently with one another with a geometrically determined form. In some jointing methods, use is also made of a "formless" additive material, i.e. a material whose shape is not defined. For example, adhesives are understood to be such an additive material.

In the present case, the at least one vibration element can be connected permanently to the at least one cover glass, for example by the following jointing methods:
  by gluing with adhesive;
  by screwing with screws directly through the cover glass or with a screw mount on the diffuser;
  by form-fit staking. By thermoplastic deformation, the cover glass becomes the holder or adapter of the vibration unit;
  by bayoneting of the vibration element with the cover glass. The term bayoneting is understood by the person skilled in the art to mean placing together or resetting as a suitable combination and sequence of pushing and rotation. The resetting usually takes place by a linear [translatory] and then rotational movement. A bayonet connection holds by means of a form-fit connection, the opening can take place by overcoming static friction and/or spring force and/or evading or opening a lock stage or lock;
  by a splay connection. With spring-loaded splaying, the joint part is first elastically deformed. After the insertion or pushing in, the elastic rebound occurs. Examples are clip connections, snap-in connections, splay rings, sheet metal springs, and safety rings, which can be used to fasten the at least one vibration element to the cover glass.

In a further advantageous embodiment of the invention, it may be expedient if, in a cleaning device, the counterweight coupled with the at least one vibration element is permanently connected by jointing to the at least one cover glass.

The aforementioned possible variants of embodiment for the joint connections apply equally to one or more counterweights, which are coupled with the at least one vibration element and which are fastened to the cover glass.

It may be particularly expedient if the at least one vibration element is integrated into the at least one cover glass in a cleaning device according to the invention.

In this embodiment, the at least one vibration element is particularly effectively integrated into the cover glass before damages or weathering influences. Vibrations of the vibration element, which are activated by the control device, are advantageously introduced in the cover glass directly on the spot for the desired cleaning. Vibration losses are thus reliably avoided. One or more vibration elements can be integrated into the cover glass for example during the production process by means of insert moulding or injection moulding by inserting the vibration element in the injection moulding process.

In a further embodiment of the invention, it may be advantageous if the at least one vibration element and the counterweight coupled with the vibration element are each integrated into the at least one cover glass in a cleaning device.

In this expedient development of the invention, apart from the one or more vibration elements, further components such as for example components which serve as a counterweight can also be embedded or integrated directly into the cover glass. Components, which serve as a counter-element on account of their flywheel mass, have the advantage that they act as resonance bodies for the vibration element and intensify the vibrations of the vibration element accordingly.

A cleaning device according to the invention can be particularly effective if two or more vibration elements spaced apart from one another are fastened to the at least one cover glass, wherein the two or more vibration elements can each be activated by a control device.

Depending on the local circumstances and requirements with regard to the cleaning tasks, a plurality of vibration elements can be arranged distributed over the surface of a cover glass. Expediently, positions of the vibration elements are selected on the cover glass which are not arranged directly in the optical beam of a headlamp located beneath the cover glass and do not therefore interfere with the generated light projection of the headlamp.

In a further development of the invention, a counterweight fastened to the at least one cover glass can be assigned to each of the two or more vibration elements in a cleaning device.

In this embodiment, the plurality of vibration elements can be individually designed. In this case, a defined counterweight is thus assigned here to each vibration element. Apart from the total mass of a vibration unit, which can vary, the density of the vibration elements per surface section of the cover glass can also vary if need be. Thus, for example, surface sections of the cover glass which have a greater exposure to soiling can be particularly efficiently cleaned by the use of a plurality of vibration elements arranged closely beside one another.

In a continuation of the invention, a cleaning device can also comprise an anti-fogging device, wherein the anti-fogging device is arranged on the inside of the at least one cover glass and the anti-fogging device is selected from the group comprising: a fog-repelling coating, a heating film and/or a heating element with heating wires.

This development of the cleaning device according to the invention offers the advantage that the cover glass can be cleaned not only on its outer side from soiling and weathering influences, but also on its inner side. The inner side is to be understood as the side of the cover glass opposite the outer side, which in the installed position in headlamp, in particular a vehicle headlamp, is orientated towards the housing of the headlamp. To prevent undesired condensate formation on the side of the glass in the presence of damp or cold weather, at least one section of the inner side of the cover glass is provided with a fog-repelling coating in this embodiment of the invention.

Such coatings known as "anti-fog" coatings for example for cover lights made of transparent polycarbonate (PC) or polymethyl methacrylate (PMMA) are available under the name MODIPER® H from the producer NOF Corporation (www.nof.co.jp).

Alternatively or in addition to a fog-repelling coating arranged at least in sections on the inner side of the glass, a heating film and/or a heating element with heating wires which are integrated into the cover glass can be provided on the inner side of the cover glass. Such electrical components can be controlled and activated by the same control device that serves to activate the at least one vibration element. If need be, a condensate formation on the inner side of the cover glass can thus be dried off quickly.

It can be particularly advantageous if the at least one vibration element is a piezoelectric vibrator generating ultrasonic vibrations in the cleaning device according to the invention.

Resonant operated piezoactuators, which serve for ultrasound generation at frequencies of 16 kHz to 200 kHz, offer the advantage of a particularly compact design, which is particularly important especially when used in vibration elements that are designed as small as possible or in compact vibration units, which are fastened to the cover glass of headlamps or vehicle headlamps as inconspicuously as possible. On account of the small size of such piezoactuators or piezoelectric vibrators, they are also suitable for being directly integrated into the cover glass, as a result of which the efficiency of the cleaning device—as already stated previously—can be further increased.

The cleaning effect of a cleaning device according to the invention can be further increased particularly efficiently if the control device cooperates with a camera and/or with a sensor, preferably an optical sensor and/or a moisture sensor.

The signal coupling of the cleaning device or of its control device with a camera and/or a suitable sensor, which detects the soiling of the cover glass, offers the advantage that the cleaning device can be automatically activated if need be. For example, in the case of a motor vehicle it can be detected by a camera whether the present weather conditions call for cleaning of the cover glass of a headlamp for example during rainfall or snowfall.

Depending on the area of application and weather conditions, it may be expedient if the activation of the at least one vibration element by the control device takes place according to an activation scheme in a cleaning device according to the invention, which is selected from the group comprising: cyclically recurring activation, manual activation, activation by means of a sensor signal, activation by means of a camera signal.

For example, the following variants are conceivable for the activation of the at least one vibration element in each case by a control device:
  cyclically recurring: the at least one vibration element is activated in defined time intervals, irrespective of the prevailing conditions (wetness, soiling etc.);
  by means of a manual activation: for example, the activation of the at least one vibration element of the cleaning device can take place in combination with the activation of windscreen cleaning, the "windscreen wiper", in a vehicle. The control device receives a signal of the windscreen cleaning, whereupon a vibration element of the cleaning device is activated;
  the vibration element is activated by means of a rain sensor on the windscreen or on the cover glass of a vehicle;
  the soiling of the cover glass is detected by means of a camera in the headlamp.

Furthermore, provision is made within the scope of the invention such that the at least one vibration element of the cleaning device can be activated and operated by the control device at different frequencies and/or amplitudes and/or time intervals and/or time durations. Different cleaning programs can thus be set with the cleaning device, in order to be able to clean as efficiently as possible the cover glass provided with the cleaning device, if possible adapted to the given individual cleaning task. For example, it may be expedient if the cleaning of the cover glass during dry weather proceeds, for example, with a greater frequency and amplitude of the vibrations of the at least one vibration element than during cleaning in rainy weather. In wet, damp weather conditions with rainfall, it may for example be sufficient if the cleaning of the cover glass for shaking off rain drops and moisture proceeds with a comparatively lower frequency and a smaller amplitude of the vibrations of the one or more vibration elements than is expedient in dry weather conditions.

The aforementioned problem is solved in a development of the invention also by a headlamp, in particular a vehicle headlamp, which comprises at least one cover glass, and which is provided with a cleaning device according to the invention for cleaning the at least one cover glass.

The aforementioned advantages of the cleaning device according to the invention apply equally also to a headlamp provided with a cleaning device, in particular a vehicle headlamp. In the present application, a cleaning device is mentioned in each case for the sake of simplification. It is obvious that the invention also includes headlamps which comprise a plurality of cleaning devices. The term cleaning device also includes different embodiments with one vibration element and also with a plurality of vibration elements.

Within the scope of the invention, a vehicle is also specified with at least one headlamp, in particular a vehicle headlamp, which is provided with a cleaning device according to the invention for cleaning the at least one cover glass of the headlamp.

The aforementioned advantages and advantageous effects of the invention apply equally also to a vehicle, which is provided with one or more headlamps with a cleaning device according to the invention.

Further details, features and advantages of the invention emerge from the following explanation of examples of embodiment of the invention represented schematically in the drawings. In the drawings:

FIG. 3 shows a cleaning device fastened to a cover glass with a vibration unit, into which a vibration element together with a counterweight are integrated, in an isometric view obliquely from above;

FIG. 4 shows a detail of a vibration unit, which is integrated into a cover glass, in a partial cross-sectional view from the side;

Below is a detailed description of the figures:

Figure 1:
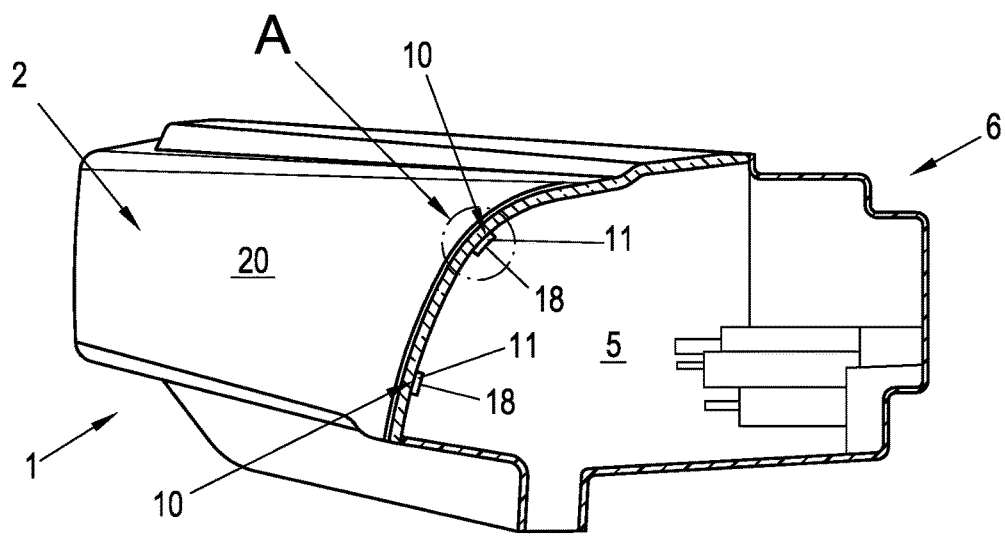
FIG. 1 shows a vehicle headlamp with a first embodiment of a cleaning device according to the invention in an isometric view obliquely from the front.

FIG. 1 shows a vehicle headlamp 1 with a first embodiment of a cleaning device 10 according to the invention. The headlamp 1 represented here comprises a cover glass 2, which is produced for example from transparent polycarbonate (PC) or polymethyl methacrylate (PMMA). Cover glass 2 comprises an outer side 3 and an inner side 4 lying opposite outer side 3. Outer side 3 of cover glass 2 in the installed position of vehicle headlamp 1 is exposed to environmental influences. Inner side 4 of cover glass 2 is orientated in the installed position towards an interior space 5 of the headlamp 1, which apart from cover glass 2 is formed by a housing 6.

A cleaning device 10 according to the invention for cover glass 2 of vehicle headlamp 1 comprises at least one vibration element 11, which is fastened to cover glass 2. Vibration element 11 can expediently be incorporated in a vibration unit 18 or integrated into the latter.

Figure 2:
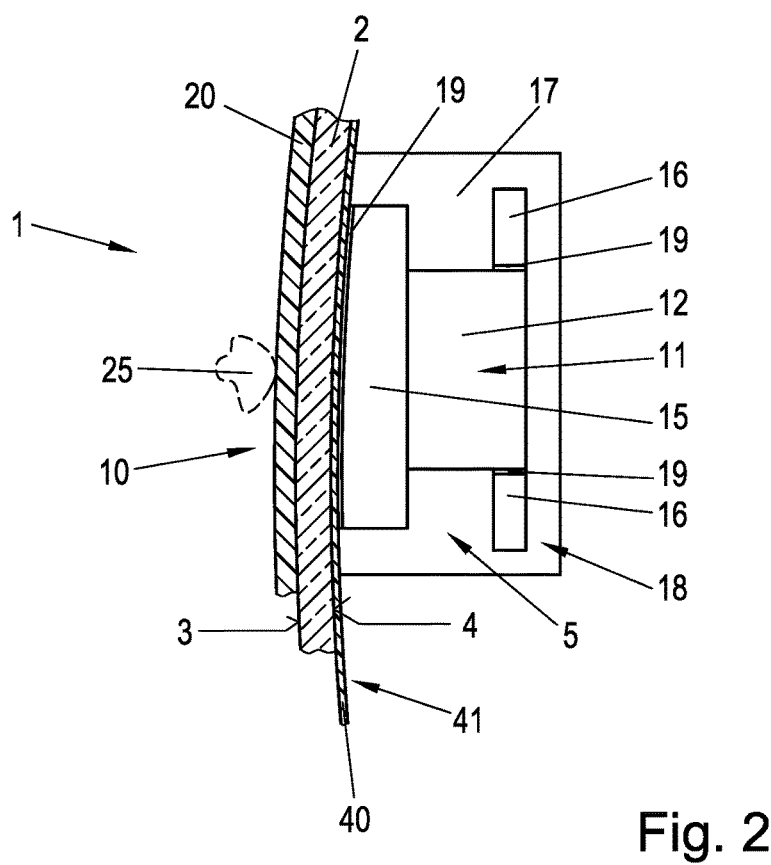
FIG. 2 shows detail A of a cleaning device marked in FIG. 1 in a partial cross-sectional view from the side.

FIG. 2 show detail A of a cleaning device 10 marked in FIG. 1. Such a vibration unit 18 is represented in a partial cross-sectional view in FIG. 2. Located inside vibration unit 18 is at least one vibration element 11, which can be activated from a control device not explicitly shown here. Vibration element 11 is constituted here for example as piezoelement 12 or as a piezoelectric vibrator 12. Piezoelectric vibrator 12 is a resonant operated piezoactuator, which serves for ultrasound generation at frequencies of 16 kHz to 200 kHz. Piezoelectric vibrator 12 in this embodiment here is on the one hand fastened to a counterweight 15 and on the other hand is fastened by means of a holder 16 in a housing 17 of vibration unit 18. Housing 17 of vibration unit 18 also houses counterweight 15. By means of adhesive 19 or adhesive film 19, counterweight 15 is glued to inner side 4 of cover glass 2. Vibration unit 18 is also firmly glued with adhesive 19 on a counterweight 15 and on holders 16 in housing 17. Vibration unit 18 together with housing 17 offers the advantage of a closed, encapsulated design which can be fastened on the spot to cover glass 2 and which now only has to be contacted electrically.

A cleaning device 10 according to the invention also comprises a hydrophobic, dirt-repelling coating 20, which is applied on outer side 3 of cover glass 2 and which prevents soiling 25, for example dirt particles, dirty water or also icing, from adhering to or continuing to adhere to outer side 3 of cover glass 2.

As outer side dirt-repelling coating 20, which serves as a weather protection for cover glass 2, use is made here of a silicone-hardcoat coating. The thickness of the coating of this silicone-hardcoat coating amounts for example to 8 to 12 μm.

In addition, an anti-fogging device 40 in the form of a fog-repelling coating 41 is applied on inner side 4 of cover glass 2.

FIG. 3 shows a cleaning device 10 fastened to a cover glass 2 with a vibration unit 18, in which a vibration element 11 together with a counterweight 15 is integrated inside housing 17. Vibration unit 18 is glued by means of an adhesive layer 19 to inner side 4 of cover glass 2. Vibration element 11 in the form of a piezoelement 12 is connected here to counterweight 15. Both counterweight 15 and vibration element 11 abut directly against cover glass 2 inside the housing 17. Vibrations of vibration unit 18 are thus introduced particularly efficiently directly and immediately into cover glass 2. Soiling, which should adhere to outer side 3 of cover glass 2 provided with a hydrophobic coating 20, can thus be shaken off particularly effectively as required by means of the resonant vibrations of piezoelectric vibrators 12.

FIG. 4 shows a detail of a vibration unit 18, which is integrated into a cover glass 2. Vibration unit 18 is embedded here in a recess 9 in cover glass 2. The cavity was then filled by a glass-clear setting adhesive 19 after the embedding of the vibration unit.

Figure 5:
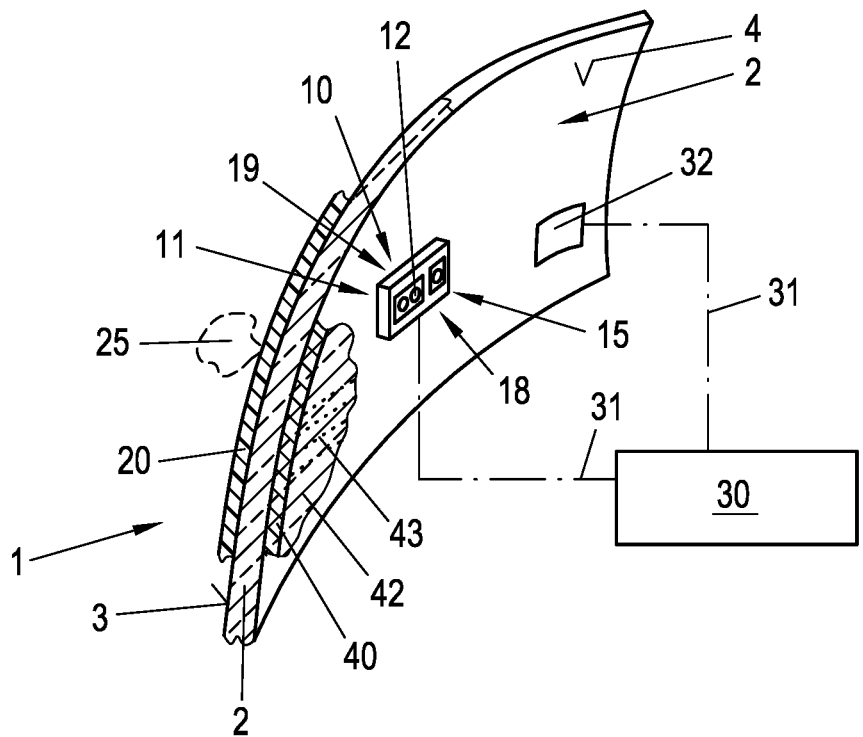
FIG. 5 shows a cover glass with a cleaning device fastened thereto in a further variant of embodiment in an isometric view obliquely from above.

FIG. 5 shows a cover glass 2, to which a further variant of embodiment of a cleaning device 10 according to the invention is fastened. Vibration unit 18 represented here diagrammatically is housed in a very flat housing 17, wherein vibration element 11 in the form of a piezoelectric vibrator 12 and counterweight 15 are arranged coupled with one another and beside one another inside housing 17. Outer side 3 of cover glass 2 comprises a hydrophobic coating 20. Inner side 4 of cover glass 2 comprises an anti-fogging device 40 in the form of a heating film 42 with a plurality of heating wires which are integrated into cover glass 2.

Figure 6:
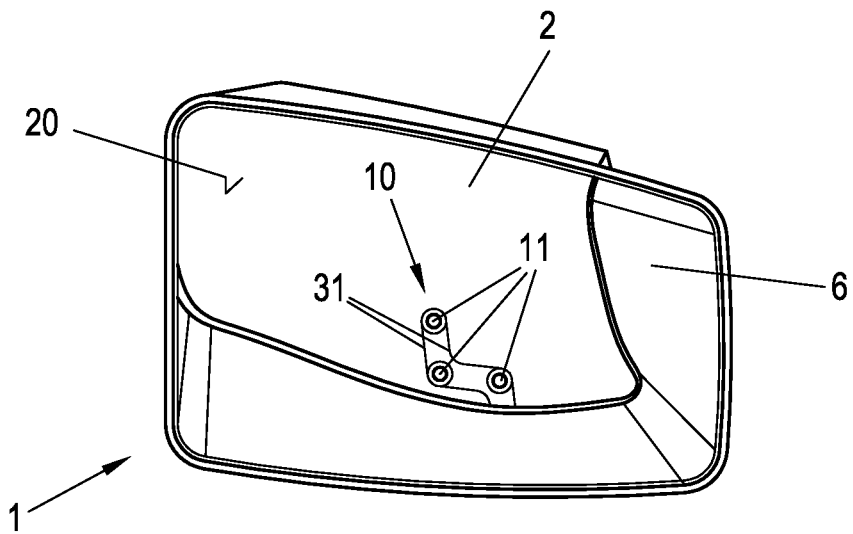
FIG. 6 shows a vehicle headlamp with the cover glass with a cleaning device according to the invention in a plan view, wherein a plurality of vibration elements are integrated into the cover glass.

FIG. 6 shows a vehicle headlamp 1 with a cover glass 2 with a cleaning device 10 according to the invention, wherein a plurality of vibration elements 11 are integrated into cover glass 2. Individual vibration elements 11 are connected with signal lines 31 to a control device not explicitly represented and can be activated together from the control device.

Figure 7:
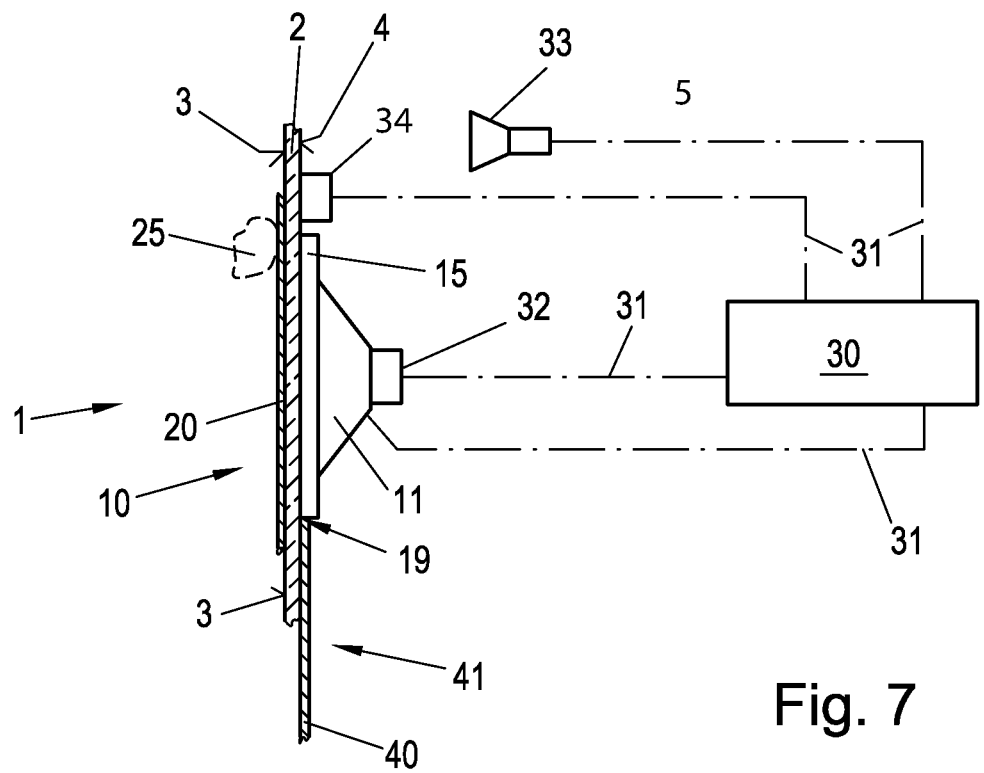
FIG. 7 shows a further variant of a cleaning device according to the invention together with the associated control system in a partial cross-sectional view from the side.

FIG. 7 represents diagrammatically a further variant of a cleaning device 10 according to the invention together with the associated control system. In this embodiment, a detail of a motor vehicle headlamp 1 is shown, wherein cover glass 2 is provided with a hydrophobic coating 20 on the outside. Plate-shaped counterweight 15 is fastened here by means of an adhesive layer 19 to inner side 4 of cover glass 2. A vibration element 11 is fastened on counterweight 15. Inner side 4 is also protected with an anti-fogging device 40, for example in the form of a fog-repelling coating 41 against undesired condensate formation. A control device 30 serves to activate vibration element 11. The control device is connected for this purpose by means of signal lines 31 to vibration element 11 or to a movement sensor 32 coupled with vibration element 11. By means of a camera 33 which is arranged in the interior 5 of headlamp 1 and which is also connected by a signal line 31 to control device 30, soiling or raindrops on cover glass 2 are detected. Activation of vibration element 11 thus takes place through control device 30 after a signal is received from camera 33. Movement sensor 32 serves here to control the proper functioning of vibration element 11.

Alternatively or in addition to a camera 33, one or more sensors 32, for example optical sensors or moisture sensors, serve to activate the at least one vibration element 11. Such sensors 32, for example rain sensors, are fastened for this purpose directly to cover glass 2 or are integrated into the latter. A camera 33, which is positioned in the interior 5 of vehicle headlamp 1 and the sensitivity of which can be programmed to indicate the moment from when soiling is detected as such and a corresponding camera signal is sent to control device 30, offers the advantage that it remains functionable with locally occurring soiling 25. A single small sensor 32, which is fastened to cover glass 2, can be masked by locally occurring, intense soiling 25 on cover glass 2 and then in some circumstances does not function. For this reason, it is expedient to provide a redundant, possibly fail-safe activation of cleaning device 10 in the case of activation of cleaning device 10 by means of sensors 32 and without the use of a camera. This can be achieved, in that a plurality of sensors 32 are positioned at different points of cover glass 2. In the case where a single sensor 32, in particular an optical sensor, does not function temporarily on account of local soiling, the vibration element 11 can nonetheless be activated by means of control device 30 by further sensors 32 connected in parallel.

Figure 8:
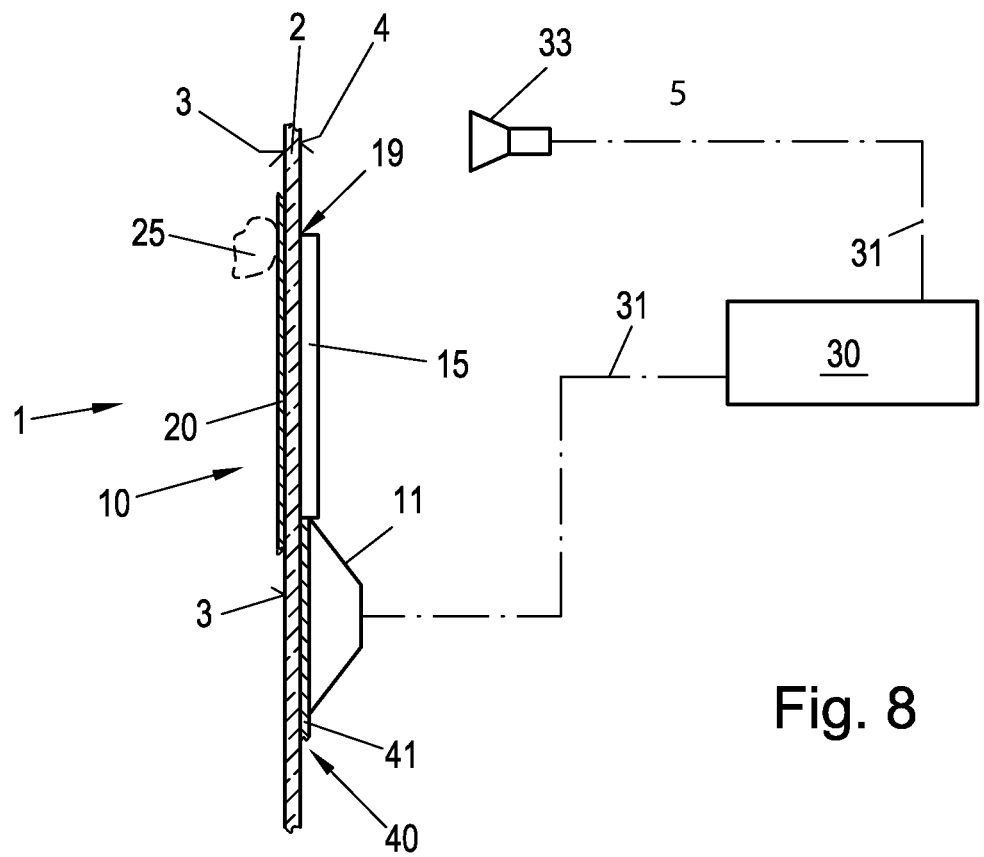
FIG. 8 shows an alternative variant of a cleaning device according to the invention together with the associated control system in a partial cross-sectional view from the side.

FIG. 8 shows a further, alternative variant of a cleaning device 10 according to the invention together with the associated control system. In contrast with FIG. 7, here in FIG. 8 counterweight 15 and vibration element 11 are coupled together and fastened beside one another at inner side 4 of cover glass 2. A control device 30 again serves to activate vibration element 11. The control device is connected for this purpose by means of signal lines 31 to vibration element 11. By means of a camera 33, which is arranged in the interior 5 of headlamp 1 and which is also connected with signal line 31 to control device 30, soiling or raindrops on cover glass 2 are detected. The activation of vibration element 11 thus takes place through control device 30 after a signal is received from camera 33.

LIST OF REFERENCE NUMBERS 1 vehicle windscreen
2 cover glass
3 outer side of cover glass
4 inner side of cover glass
5 interior of vehicle headlamp
6 housing of vehicle headlamp
9 recess in cover glass
10 cleaning device
11 vibration element
12 piezoelement, piezoelectric vibrator
15 counterweight
16 holder
17 housing of vibration unit
18 vibration unit
19 adhesive
20 hydrophobic coating
25 soiling, dirt particles
30 control device
31 signal line
32 sensor
33 camera
40 anti-fogging device
41 fog-repelling coating
42 heating film
43 heating wire

The invention claimed is:

1. A device (10) for cleaning at least one cover glass (2) of a vehicle headlamp (1) comprising:
    at least one vibration element (11) fastened to the least one cover glass (2), wherein the least one vibration element (11) can be activated by a control device (30), wherein the at least one cover glass (2) comprises on its outer side (3) a hydrophobic and dirt-repelling coating (20), wherein the at least one vibration element (11) is coupled with a counterweight (15) fastened to the least one cover glass (2), and
    wherein the at least one vibration element (11) and the counterweight (15 coupled with the vibration element (11) are each integrated into the at least one cover glass (2).

2. The cleaning device (10) according to claim 1, wherein that at least one vibration element (11) is connected in one piece to the counterweight (15).

3. The cleaning device (10) according to claim 1, wherein the at least one vibration element (11) is permanently connected by jointing to the at least one cover glass (2).

4. The cleaning device (10) according to claim 1, wherein the counterweight (15) coupled with the at least one vibration element (11) is connected permanently by jointing to the at least one cover glass (2).

5. The cleaning device (10) according to claim 1, wherein two or more vibration elements (11) spaced apart from one another are fastened to the at least one cover glass (2), wherein the two or more vibration elements (11) can each be activated from a control device (30).

6. The cleaning device (10) according to claim 2, wherein a counterweight (15) fastened to the least one cover glass (2) is assigned to each of the two or more vibration elements (11).

7. The cleaning device (10) according to claim 1, further comprising an anti-fogging device (40) arranged at the inner side (4) of the at least one cover glass (2) wherein the anti-fogging device (40) is selected from a fog-repelling coating (41), a heating film (42) and/or a heating element with heating wires (43).

8. The cleaning device (10) according to claim 1, wherein the at least one vibration element (11) is a piezoelectric vibrator (12) configured to generate ultrasonic vibrations.

9. The cleaning device (10) according to claim 1, wherein the control device (30) cooperates with a camera (33) and/or with a sensor (32).

10. The cleaning device (10) according to claim 9, wherein the sensor (32) comprises an optical sensor or a moisture sensor.

11. The cleaning device (10) according to claim 1, wherein the activation of the at least one vibration element (11) by the control device (30) takes place according to an activation scheme, which is selected from cyclically recurring activation, manual activation, activation by means of a sensor signal, and activation by means of a camera signal.

12. A vehicle headlamp (1), comprising at least one cover glass (2), with a cleaning device (10) according to claim 1, which is configured to clean the at least one cover glass (2).

13. A vehicle comprising at least one headlamp according to claim 12.

\* \* \* \* \*